United States Patent [19]

Imakoshi et al.

[11] Patent Number: 4,734,644
[45] Date of Patent: Mar. 29, 1988

[54] FLUX CANCELLING YOKE TYPE MAGNETIC TRANSDUCER HEAD

[75] Inventors: Shigeyoshi Imakoshi; Hideo Suyama; Yutaka Soda; Munekatsu Fukuyama, all of Kanagawa, Japan

[73] Assignee: Sony Corporation, Tokyo, Japan

[21] Appl. No.: 841,259

[22] Filed: Mar. 19, 1986

[30] Foreign Application Priority Data

Mar. 20, 1985 [JP] Japan ................................. 60-56322

[51] Int. Cl.[4] ...................... G01R 33/02; H01L 43/00; G01B 5/33; G01B 5/127
[52] U.S. Cl. .................................. 324/252; 360/113; 338/32 R
[58] Field of Search ...................... 324/252; 338/32 R; 360/113, 125, 127

[56] References Cited

U.S. PATENT DOCUMENTS 4,354,212  10/1982  Nouchi et al. ...................... 360/113

Primary Examiner—Reinhard J. Eisenzopf
Assistant Examiner—Walter E. Snow
Attorney, Agent, or Firm—Hill, Van Santen, Steadman & Simpson

[57] ABSTRACT

A yoke type magnetic transducer head utilizing a magnetoresistance effect in which a magnetoresistance effect sensing portion is provided so as to magnetically couple a cut-away portion in a magnetic circuit including an operation gap and a magnetic yoke having in its one portion the cut-away portion and in which a first bias magnetic field is applied to the magnetoresistance effect sensing portion by a first magnetic flux that is generated when a current is flowed through the magnetoresistance effect sensing portion, or when a current is flowed through both the magnetoresistance effect sensing portion and a bias conductor, which includes a hard magnetic layer for generating a second magnetic flux by which a second bias magnetic field is applied to the magnetoresistance effect sensing portion and for passing through the magnetic yoke a magnetic flux which cancels at least a part of the first magnetic flux which passes through the magnetic yoke.

4 Claims, 6 Drawing Figures

FLUX CANCELLING YOKE TYPE MAGNETIC TRANSDUCER HEAD

BACKGROUND OF THE INVENTION

1. Field of the Invention

The present invention relates generally to a yoke type magnetic transducer head utilizing the magnetoresistance effect and, more particularly, is directed to a structure of a yoke type magnetic transducer head utilizing the magnetoresistance effect for applying a bias to a magnetoresistance effect sensing portion thereof.

2. Description of the Prior Art

A structure of a prior art yoke type magnetic transducer head utilizing the magnetoresistance effect (hereinafter simply referred to as a yoke type MR head) will be described with reference to FIG. 1.

Referring to FIG. 1, on a magnetic substrate 1, there is formed a bias conductor 3 made of a band-shaped conductive film. When the magnetic substrate 1 has conductivity, this bias conductor 3 is formed on the magnetic substrate 1 through an insulating layer 2 made of $SiO_2$ and the like. This bias conductor 3 is formed on the magnetic substrate 1 through an insulating layer 21 made of $SiO_2$ and the like. This bias conductor 3 is adapted to apply a bias magnetic field to a magnetoresistance effect sensing portion (hereinafter simply referred to as an MR portion) 5 which will be described later. The magnetic substrate 1 is made of a soft magnetic ferrite such as an Ni-Zn ferrite or an Mn-Zn ferrite, while the bias conductor 3 is made of, for example, Cu.

On the bias conductor 3, there is formed through an insulating layer 4 made of $SiO_2$ or the like a magnetic thin film having the magnetoresistance effect which forms the MR sensing portion 5. The MR thin film is made of Ni-Fe alloys, Ni-Co alloys and the like and the width thereof is selected to be $W_{MR}$. An insulating layer 6 is formed on the MR sensing portion 5.

Magnetic layers 7a and 7b are respectively formed to be extended along the direction to traverse the bias conductor 3 and the MR sensing portion 5 with their one ends superposed on both ends of the MR sensing portion 5. The magnetic layers 7a and 7b are made of soft magnetic material such as $M_O$ permalloy and the like and constitute a magnetic yoke 8. To the upper surface of the MR head portion thus constructed, there is bonded a protecting substrate 10 made of glass and the like through a protecting layer 9 made of non-magnetic insulating material such as $SiO_2$ and the like.

A non-magnetic gap spacer layer (a part of the insulating layer 2) 11 is interposed between one magnetic layer 7a and the front end portion of the magnetic substrate 1 to form a front magnetic operation gap g. The front surfaces of the magnetic substrate 1, the gap spacer layer 11, the magnetic layer 7a, the protecting layer 9 and the protecting substrate 10 are polished so as to face the magnetic gap g to the outside, thus forming a magnetic recording medium contact surface 12.

A cut-away portion 13 having a width W is formed between the opposing end surfaces of the magnetic layers 7a and 7b. The rear end and the front end of both the magnetic layers 7a and 7b are electrically insulated from both sides of the MR sensing portion 5 due to the existence of the insulating layer 6 but are magnetically coupled with each other. The portions of the magnetic layers 7a and 7b separated by the cut-out portion 13 of the magnetic yoke 8 are coupled to each other via the MR sensing portion 5 thereby forming a magnetic circuit which forms a closed magnetic path from the magnetic substrate 1 through the operation gap g, the magnetic layer 7(a), the MR sensing portion 5 and the magnetic layer 7(b) to the magnetic substrate 1.

In such a yoke type MR magnetic transducer head, by supplying a bias current to the bias conductor 3, it is possible to apply a predetermined bias magnetic field to the MR sensing portion 5 by which a linear reproduced output is derived.

Upon the playback mode of the yoke type MR magnetic transducer head thus constructed, it is possible to apply a bias magnetic field to the MR sensing portion 5 by flowing a bias current (D.C. current) to the bias conductor 3. Further, a sense current is supplied to the MR sensing portion 5. A magnetic flux generated by these currents passes through not only the MR sensing portion 5 but also the magnetic yoke 8, that is, the magnetic layers 7a and 7b as shown by a one-dot chain line $MF_1$ in FIG. 1. As a result, the permeability of the magnetic yoke 8 is lowered and the sensitivity (maximum sensitivity) of the head is lowered and scattered. Also a Barkhausen noise may readily occur, and is not desirable.

Similar problems will take part more or less in a yoke type magnetic transducer head utilizing the magnetoresistance effect but which has no bias conductor. The reason for this is that when a sense current is flowed to the MRT sensing portion 5, magnetic flux is generated therearound. Then, the magnetic bias is applied to the MR sensing portion itself by the magnetic flux. In this case, part of this magnetic flux is passed through the magnetic yoke.

OBJECTS AND SUMMARY OF THE INVENTION

Accordingly, it is an object of the present invention to provide an improved magnetic transducer head utilizing the magnetoresistance effect.

It is another object of the present invention to provide a yoke type magnetic transducer head utilizing the magnetoresistance effect, having an improved sensitivity.

It is a further object of the present invention to provide a yoke type magnetic transducer head utilizing the magnetoresistance effect, having stabilized characteristics.

It is still a further object of the present invention to provide a yoke type magnetic transducer head utilizing the magnetoresistance effect, with reduced Barkhausen noise generation.

According to one aspect of the present invention, there is provided a magnetic transducer head utilizing the magnetoresistance effect in which a magnetroresistance effect sensing portion is provided so as to magnetically couple a cut-away portion in a magnetic circuit including an operation gap and a magnetic yoke having in its one portion said cut-away portion; a first bias magnetic field is applied to said magnetoresistance effect sensing portion by a first magnetic flux that is generated when a current is flowed through said magnetoresistance effect sensing portion or when a current is flowed through both said magnetoresistance effect sensing portion and the bias conductor, characterized in that a hard magnetic layer is provided for generating a second magnetic flux by which a second bias magnetic field is applied to said magnetoresistance effect sensing portion and for passing through said yoke a magnetic flux which cancels a part of the first magnetic flux which pass through said magnetic yoke.

These and other objects, features and advantages of the present invention will become apparent from the following detailed description of the preferred embodiment taken in conjunction with the accompanying drawings, throughout which like reference numerals designate like elements and parts.

DESCRIPTION OF THE PREFERRED EMBODIMENTS

Figure 1:
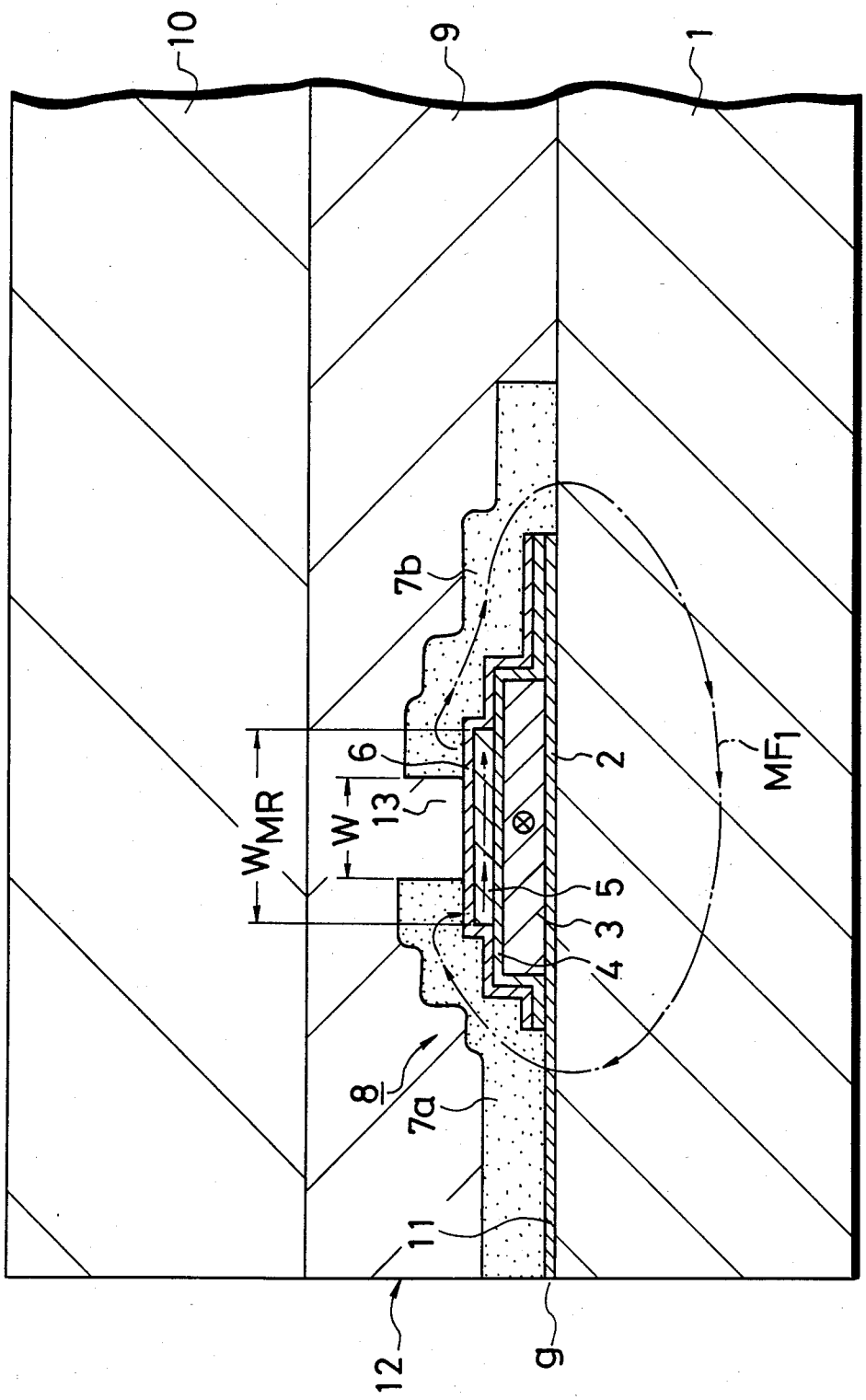
FIG. 1 is a cross-sectional view of a prior art yoke type magnetic transducer head utilizing the magnetoresistance effect.
Figure 2:
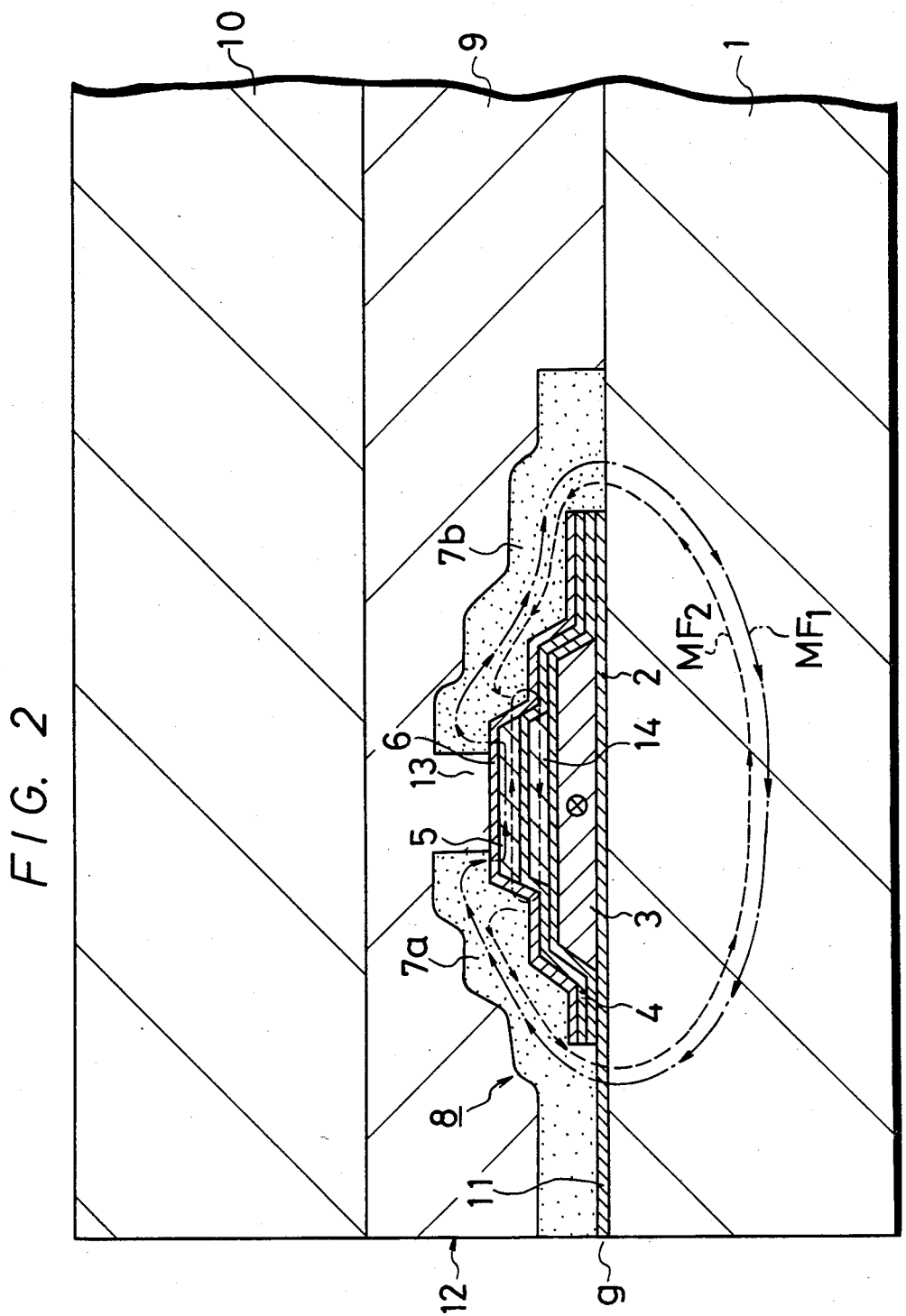
FIG. 2 is a cross-sectional view showing an embodiment of a yoke type magnetic transducer head utilizing the magnetoresistance effect according to the present invention.

An embodiment of the yoke type magnetic transducer head utilizing the magnetoresistance effect according to the present invention is illustrated in FIG. 2. In FIG. 2, like parts corresponding to those of FIG. 1 are marked with the same references and will not be re-described in detail.

In this embodiment, on the bias conductor 3, there is formed through the insulating layer 4 formed on the bias conductor 3 a hard magnetic layer 14 of a thin film such that the hard magnetic layer 14 is located beneath and in proximity to the MR sensing portion 5 so as to be covered with this MR sensing portion 5. This hard magnetic layer 14 may be made of Ni-Co alloys and the like whose coercive force Hc is not so high, but whose coercive force Hc is, for example Hc 20 (Oe) under which the magnetization is not inverted by the external magnetic field.

Figure 3:
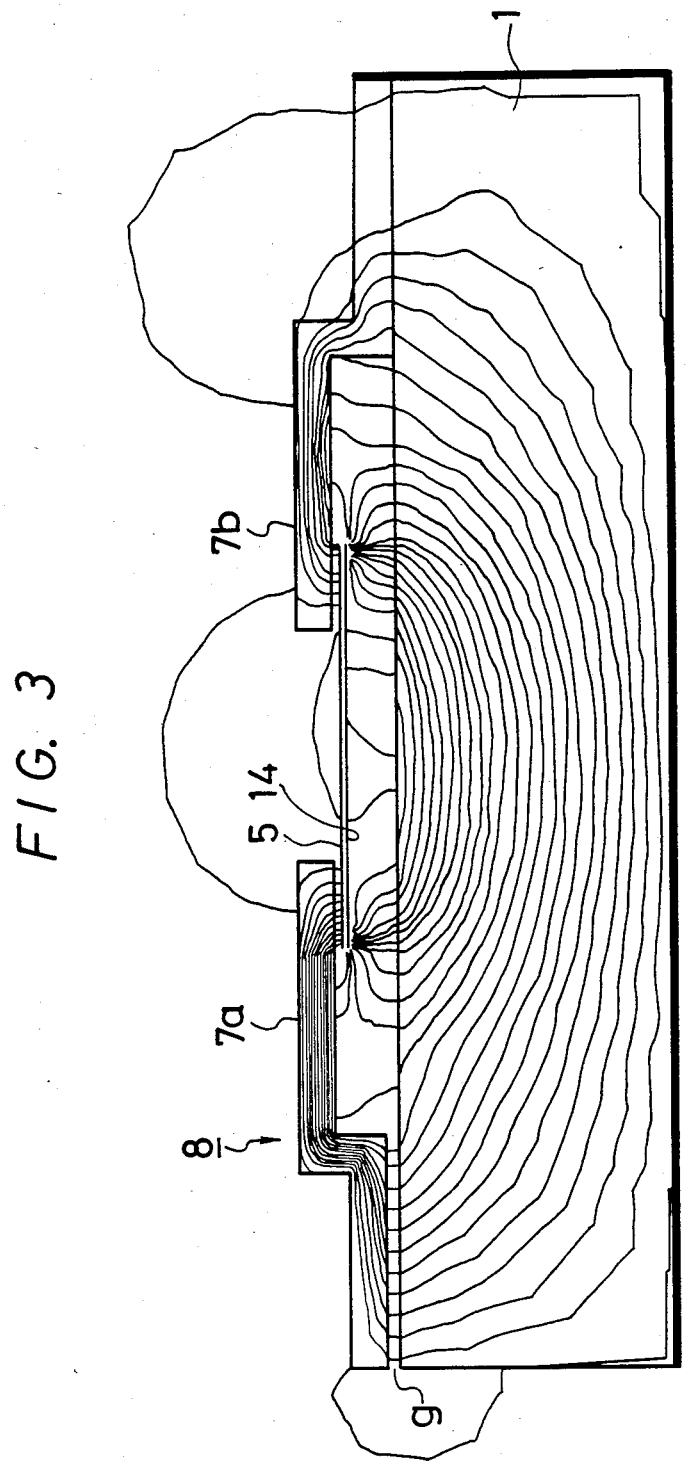
FIGS. 3 and 5 are respectively diagrams showing the distribution of a magnetic flux when a hard magnetic layer is located in a magnetic circuit comprising the magnetic transducer head of the present invention.

The hard magnetic layer 14 is magnetized to serve as a permanent magnet such that the magnetic flux from hard magnetic layer 14 passes as shown by a broken line curve $MF_2$ in FIG. 2. In other words, the magnetic flux $MF_2$ exists within the plane of FIG. 2, and passes through a closed magnetic circuit formed of the magnetic substrate 1, the magnetic gap g, the magnetic layer 7a, the MR sensing portion 5, the magnetic layer 7b and the magnetic substrate 1. In order that the direction of the magnetic flux $MF_2$ generated by supplying the current to the bias conductor 3 and supplying the sense current to the MR sensing portion 5 within this MR sensing portion 5, the hard magnetic layer 14 and the direction of the current flow in the MR sensing portion 5 and the bias conductor 3 are selected. On the other hand, as shown in FIG. 2, in the soft magnetic layers 7a and 7b which constitute the magnetic yoke 8, the directions of the magnetic fluxes $MF_1$ and $MF_2$ become opposite to each other so that the magnetic fluxes passing through the magnetic yoke 8 are canceled out. Other arangements are similar to those of the prior art yoke type MR head shown in FIG. 1. An explanation will now be given on how to calculate current supplied to the bias conductor 3 and an optimum value of the width of the hard magnetic layer 14. FIG. 3 shows a distribution of a magnetic flux generated from the hard magnetic layer 14 (having a thickness of 300 Å) as the permanent magnet in a case where the widths of the MR sensing portion 5 and the hard magnetic layer 14 are made equal (e.g., 9 μm).

Figure 4:
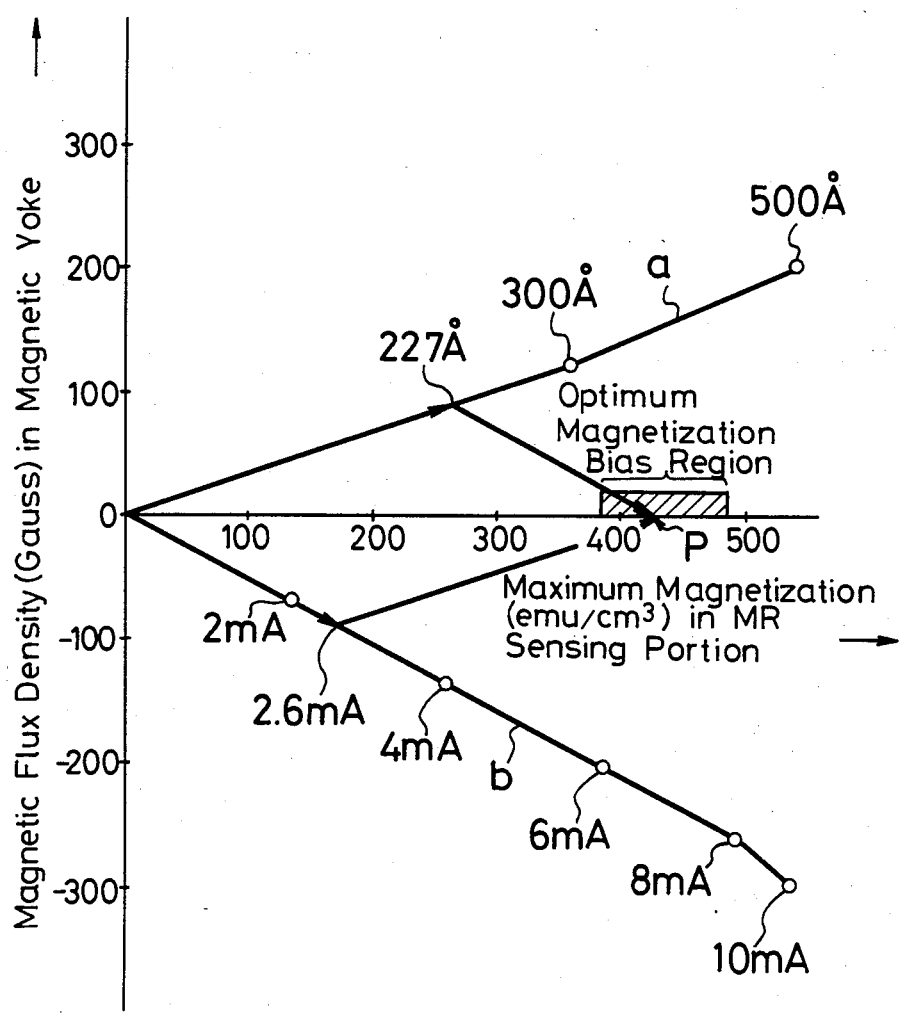
FIGS. 4 and 6 are respectively graphs showing relationships between a bias current amount, a thickness of the hard magnetic layer and a magnetic flux amount in the magnetic yoke.

In the graph of FIG. 4, a line a indicates calculated results in which the magnetic flux density (gauss) in the magnetic yoke 8 and the maximum magnetization (emu/cm$^3$) in the MR sensing portion 5 are calculated by the finite element method when the thickness of the hard magnetic layer 14 in the MR head having the structure shown in FIG. 3 was being varied. While, a line b indicates calculated results in which the magnetic flux density (gauss) in the magnetic yoke 8 and the maxium magnetization (emu/cm$^3$ in the MR sensing portion 5 are calculated by the finite element method when the current flowed in the bias conductor 3 was being changed. The current values indicated in FIG. 4, however, result respectively from multiplying the current flowed in the bias conductor 3 and the sense current flowed in the MR sensing portion 5 with 0.5 and adding these multiplied values. FIG. 3 shows an example in which the widths of the MR sensing portion 5 and the hard magnetic layer 14 are equally selected to be 9 μm.

The optimum magnetization bias region in which a sufficient sensitivity is obtained in the MR sensing portion 5 is presented when the maximum magnetization within the MR sensing portion 5 lies in a range from substantially 380 to 490 (emu/cm$^3$) within that range is set on the abscissa which indicates the maximum magnetization of the MR sensing portion 5 and a parallelogram is formed by the original point, the point P and the lines a and b to thereby compose the vectors, it will be understood that when the thickness of the hard magnetic layer 14 is substantially 227 Å and the bias current is substantially 2.6 mA, the magnetic flux can be substantially prevented from flowing through the magnetic layer 7a of the magnetic layer 8.

Figure 5:
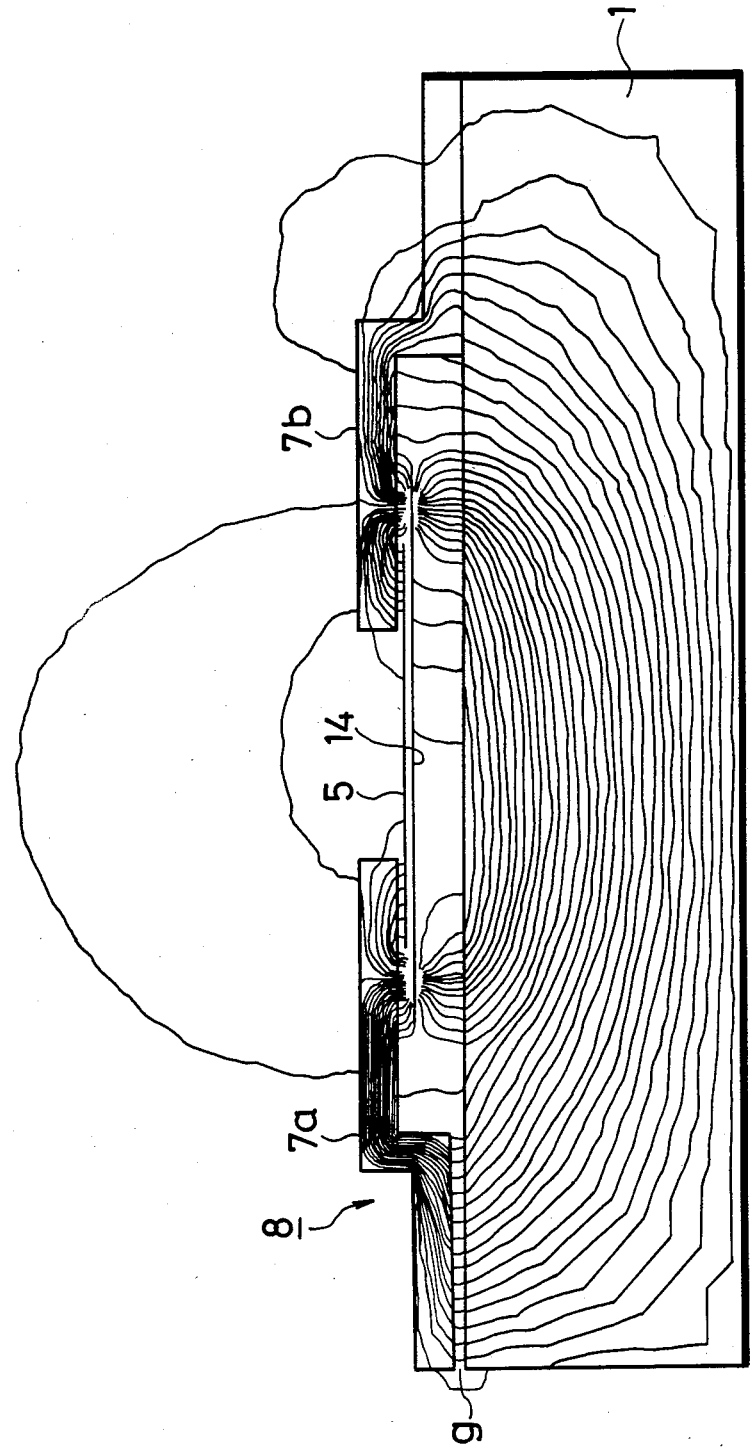
Figure 6:
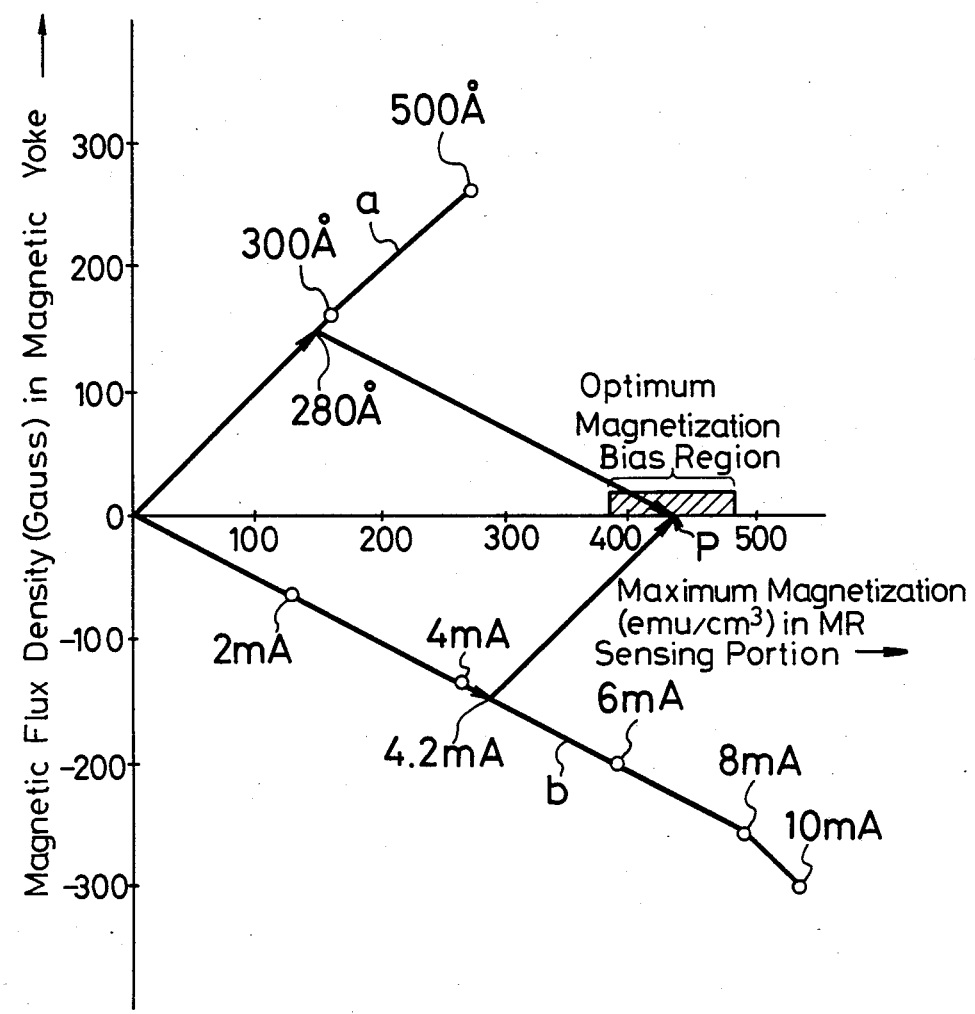

FIG. 5 shows a distribution state of a magnetic flux generated from the hard magnetic layer 14, which serves as a permanent magnet, when the widths of the MR sensing portion 5 and the hard magnetic layer 14 are selected to be different, such as 9 μm and 11 μm, respectively. Under the state that the width of the MR sensing portion 5 is selected to be 9 μm and the width of the hard magnetic layer 14 is selected to be 11 μm as described in connection with FIG. 5, lines a and b similar to those in FIG. 4 are obtained as shown in FIG. 6. Then, if a point P of, for example, 440 (emu/cm$^3$) is set on the abscissa of the maximum magnetization of the MR sensing portion 5 and a parallelogram is formed by the original point, the point P and the lines a and b to thereby compose the vectors, it will be apparent that when the thickness of hard magnetic layer 14 is substantially 280 Å and the bias current is substantially 4.2 mA, the magnetic flux can be substantially prevented from flowing through the magnetic layer 7a of the magnetic yoke 8.

In the embodiment of FIG. 2, it may be possible to omit the bias conductor 3.

According to the present invention as described above, the magnetic flux can be substantially prevented from flowing through the magnetic yoke. Thus, it is possible to provide the yoke type magnetic transducer head utilizing the magnetoresistance effect in which the sensitivity is high, stable and is scattered little, and less Barkhausen noise occurs.

The above description is given on preferred embodiments of the invention but it will be apparent that many modifications and variations may be effected by one skilled in the art without departing from the spirit or scope of the novel concepts of the invention, so that the scope of the invention should be determined by that of the appended claims only.

We claim as our invention:

1. A yoke type magnetic transducer head utilizing a magnetoresistance effect comprising:

a lower soft magnetic core and an upper soft magnetic core forming an operating gap at one end thereof facing a traveling magnetic recording medium, said upper soft magnetic layer having a cut away portion therein dividing a front core portion and a rear core portion, a magnetoresistance sensing portion provided to said cut away portion to magnetically bridge said front core portion and said rear core portion thus forming a closed magnetic path of said lower soft magnetic core, said operating gap, said front core portion, said magnetoresistance sensing portion and said rear core portion, a first bias magnetic field means generated by applying current at least through said magnetoresistance sensing portion, passing magnetic flux generated by said first bias magnetic field means along one direction in said magnetoresistance sensing portion and said upper and lower magnetic core portions, and a second bias magnetic field means generated by a hard magnetic layer provided adjacent to said magnetoresistance sensing portion, passing magnetic flux along said one direction in said magnetoresistance sensing portion and along another direction in said upper and lower magnetic core portions to at least partially cancel said magnetic flux generated by said first magnetic field means in said upper and lower core portions.

2. A transducer head constructed in accordance with claim 1 wherein said hard magnetic layer has a width substantially the same as the width of said sensing portion.

3. A transducer head constructed in accordance with claim 1 wherein said hard magnetic layer has a width greater than the width of said sensing portion.

4. Magnetic transducer head according to claim 1 further comprising a bias conductor provided in said magnetic path to work as a part of said first magnetic field means.

* * * * *